Jan. 25, 1949.                J. L. HURAULT                2,460,012
                         SYSTEM OF PRODUCING HARMONICS
                             Filed Oct. 25, 1945
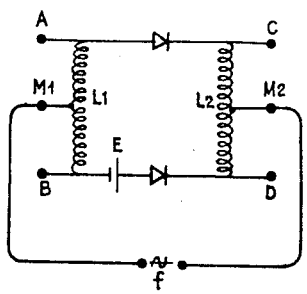
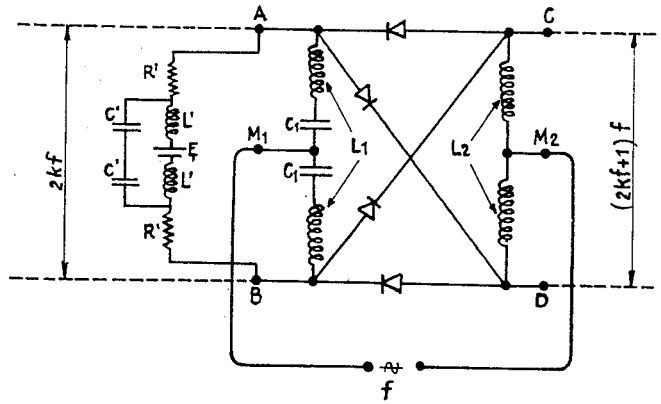
Inventor:
Jean Louis Hurault
by Edward H. Palmer
       atty Patented Jan. 25, 1949

2,460,012

UNITED STATES PATENT OFFICE 2,460,012

SYSTEM OF PRODUCING HARMONICS

Jean Louis Hurault, Paris, France, assignor to Compagnie Generale D'Electricite, Paris, France, a corporation of France Application October 25, 1945, Serial No. 624,352
In France October 27, 1944

4 Claims. (Cl. 172—281)

There are known systems which are capable of producing harmonic frequencies from one fundamental frequency. Certain of these systems are based on the use of elements having non-linear conductivity. Others of them are based on the use of thermionic tubes functioning in the non-linear portions of their characteristic, or connected in circuit so as to produce relaxation oscillations.

Such circuits, particularly used for the production of carrier frequencies in systems of multiplex telephony, necessitate either an amplification of power ahead of the master oscillator or one or more relaxation tube circuit synchronised by the basic oscillator. In short they are characterised by the use of active elements necessitating a supply of current and subject to ageing and wear.

The present invention permits of obviating these disadvantages and does not require any active member between the basic oscillation and the terminals making use of the harmonic frequencies.

It has for its object a device for producing harmonics characterised by the use of a balanced modulator supplied with continuous current and looped on suitable impedances.

According to a preferred form of the invention the modulator is supplied by the fundamental voltage at the mid-points of the looped impedances, a source of continuous current being connected in parallel with one of the looped impedances.

The use of a modulator with a cut-off permits of obtaining without discrimination the harmonics from the fundamental frequency.

The use of a modulator with inversion permits of obtaining separately the harmonics of even series and the harmonics of odd series, the former being obtained at the terminals across which the continuous voltage is applied, the latter at the opposite terminals.

The accompanying drawing shows by way of example, two forms of the present invention using, respectively, a modulator with a cut-off, and an inversion modulator.

Fig. 1 illustrates a circuit utilising a modulator with a cut-off for the production of all the harmonic frequencies. L1 and L2 are two balanced impedances constituted for example by self inductances which loop the modulator and between the mid-points of which is applied the fundamental frequency $f$.

According to the present invention the modulator is supplied also by a source providing a continuous voltage E.

There are thus obtained between terminals AB or CD of the modulator, the harmonics of the fundamental frequency $f$.

Fig. 2 represents a circuit utilizing an inversion modulator for the separate production of even and odd harmonics.

L1 and L2 are two balanced impedances constituted for example by self inductances which loop the modulator and between the mid-points of which is applied the fundamental frequency $f$.

According to the present invention the modulator is supplied by a source, as a battery, the continuous voltage E of which is applied to the terminals of one of the self inductances, L1 for example, through the medium of a filter L'C' intended to eliminate battery noises, and of resistances R' permitting regulation of the continuous current. Two condensers C1 inserted at the mid-point of the self inductance L1 prevent short circuiting of the continuous voltage.

The even harmonic frequencies are thus obtained at the terminals of the self inductance L1, the odd frequencies at the terminals of the self inductance L2.

The described results illustrated by examples utilizing modulators in ring form, would also be obtained by any other type of balanced modulator which it would be sufficient to supply on the one hand with carrier frequency, and on the other hand with continuous current and to loop over suitable dipoles.

The amplitudes of the different harmonics are independent to a very large extent of the voltage of the source of fundamental frequency $f_1$ and depend only on the continuous voltage. This latter, moreover, is defined with great precision (several hundredths) in the amplifying relay stations of long distance sub-terranean lines.

These amplitudes are on the other hand a simultaneous function of the loops of the modulator. It is thus possible by suitably selecting the dipoles of the loops to bring their value into conformity with a quite definite law.

In particular, if these dipoles are constituted of low-loss self inductances, the amplitudes of the harmonics may be rendered equal to less than 1% to series 25 (odd side) and 26 (even side).

Calculations show on the other hand that the amplitude of a harmonic of a given series obtained with an inversion modulator, is double the amplitude of the harmonic of the same series obtained with a modulator with cut-off.

I claim:

1. In a system for obtaining harmonic frequencies from a fundamental frequency, a transducer unit having four arms, two opposite ones of said arms consisting of impedances each having a mid-tap about which each said impedance arm is symmetrical, a source of alternating current of fundamental frequency connected to said two mid-taps, each of the other two opposite arms of said unit comprising a unilateral conducting element and said elements being poled to oppose each other ring-wise around the arms of said unit, a source of direct current potential connected to one of said arms, and two pairs of output terminals respectively connected to the ends of said impedance arms.

2. In a system for obtaining harmonic frequencies from a fundamental frequency, a transducer unit having four arms, two opposite ones of said arms consisting of impedances each having a mid-tap about which each said impedance arm is symmetrical, a source of alternating current of fundamental frequency connected to said two mid-taps, each of the other two opposite arms of said unit comprising a unilateral conducting element and said elements being poled to oppose each other ring-wise around the arms of said unit, a source of direct current potential connected in series in one arm containing a said element, and two pairs of output terminals respectively connected to the ends of said impedance arms.

3. In a system for obtaining separately even harmonics and odd harmonics of a fundamental frequency, a transducer unit having four arms, two opposite ones of said arms consisting of impedances each having a mid-tap about which each said impedance arm is symmetrical, a source of alternating current of fundamental frequency connected to said two mid-taps, each of the other two opposite arms of said unit comprising a unilateral contact element and said elements being poled to oppose each other ring-wise around the arms of said unit, a source of direct current connected across one of said impedance arms, two diagonal connections in said transducer unit between opposite common points of a unilateral element arm and an impedance arm, and an auxiliary unilateral conducting element in each of said diagonal connections, output terminals having even harmonics connected to the ends of said impedance arm to which direct current is applied, and output terminals having odd harmonics connected to the ends of the other said impedance arm.

4. A system according to claim 3, said impedance arm to which direct current is applied, further comprising a pair of condensers respectively connected in series between its mid-tap and a portion of said impedance on each side thereof.

JEAN LOUIS HURAULT.

REFERENCES CITED

The following references are of record in the file of this patent:

UNITED STATES PATENTS

| Number | Name | Date |
| --- | --- | --- |
| 2,103,090 | Plebanski | Dec. 21, 1937 |
| 2,191,315 | Guanella | Feb. 20, 1940 |

FOREIGN PATENTS

| Number | Country | Date |
| --- | --- | --- |
| 516,844 | Great Britain | Jan. 12, 1940 |
| 832,078 | France | June 20, 1938 |